United States Patent
Trainin et al.

(10) Patent No.: US 11,818,760 B2
(45) Date of Patent: *Nov. 14, 2023

(54) TRANSMIT OPPORTUNITY CONTINUATION TIMEOUT FOR DIRECTIONAL MULTI-GIGABIT NETWORKS

(71) Applicant: Intel Corporation, Santa Clara, CA (US)

(72) Inventors: Solomon Trainin, Haifa (IL); Carlos Cordeiro, Portland, OR (US); Laurent Cariou, Portland, OR (US); Ou Yang, Santa Clara, CA (US); Assaf Kasher, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/725,416

(22) Filed: Apr. 20, 2022

(65) Prior Publication Data

US 2022/0248468 A1 Aug. 4, 2022

Related U.S. Application Data

(63) Continuation of application No. 16/087,092, filed as application No. PCT/US2016/068628 on Dec. 27, 2016, now Pat. No. 11,337,249.

(Continued)

(51) Int. Cl.
*H04W 74/08* (2009.01)
*H04B 7/0452* (2017.01)
*H04W 16/28* (2009.01)

(52) U.S. Cl.
CPC ....... *H04W 74/0816* (2013.01); *H04B 7/0452* (2013.01); *H04W 16/28* (2013.01)

(58) Field of Classification Search
CPC . H04W 74/0816; H04W 16/28; H04B 7/0452
See application file for complete search history.

(56) References Cited

U.S. PATENT DOCUMENTS

2005/0141459 A1* 6/2005 Li ............... H04L 25/0204
370/334
2013/0235796 A1 9/2013 Kwon et al.
(Continued)

FOREIGN PATENT DOCUMENTS

EP 1594259 A1 11/2005
WO 2009027931 A2 3/2009
(Continued)

OTHER PUBLICATIONS

EPO; Office Action issued in EP Patent Application No. 16899687.4, dated Dec. 8, 2022; 4 pages.
(Continued)

*Primary Examiner* — Steven Hieu D Nguyen
(74) *Attorney, Agent, or Firm* — Alliance IP, LLC (57) ABSTRACT

A wireless communication device, system and method. The device includes a memory, and processing circuitry coupled to the memory. The processing circuitry includes logic to: determine a training field length associated with a directional multigigabit (DMG) CTS frame of another wireless communication device; determine a Clear-To-Send time (CTS_Time) parameter based at least in part on the training field length; determine a transmit opportunity (TXOP) continuation timeout for the device based on the CTS_Time parameter; and set a network allocation vector (NAV) for the device based on the TXOP continuation timeout.

10 Claims, 6 Drawing Sheets

Related U.S. Application Data (60) Provisional application No. 62/325,291, filed on Apr. 20, 2016.

(56) References Cited

U.S. PATENT DOCUMENTS

| | | | |
|---|---|---|---|
| 2015/0146808 A1* | 5/2015 | Chu | H04L 27/2626 375/260 |
| 2015/0349857 A1 | 12/2015 | Cordeiro et al. | |
| 2017/0195141 A1* | 7/2017 | Sanderovich | H04L 5/0055 |

FOREIGN PATENT DOCUMENTS

| | | | |
|---|---|---|---|
| WO | 2012169751 A2 | 12/2012 | |
| WO | 2014151951 A1 | 9/2014 | |

OTHER PUBLICATIONS

EPO; Extended European Search Report issued in EP Patent Application No. 16899687.4, dated Nov. 13, 2019; 8 pages.
International Preliminary Report on Patentability dated Apr. 5, 2018, for PCT Application No. PCT/US2016/068628, 18 pages.
International Search Report dated Apr. 17, 2017, for PCT Application No. PCT/US2016/068628, 4 pages.
Nguyen, C.L., et al., "Time Synchronization Algorithm in IEEE 802.11A Communication System", In Proceedings of the 20th European Signal Processing Conference (EUSIPCO), Aug. 27-31, 2012, 5 pages.
Perahia, E., et al., "Gigabit Wireless LANs an overview of IEEE 802.11ac and 802.11ad", ACM SIGMOBILE Mobile Computing and Communications Review, vol. 15, No. 3, Jul. 2011, pp. 23-33.
Written Opinion of the International Searching Authority dated Apr. 17, 2017, for PCT Application No. PCT/US2016/068628, 9 pages.

* cited by examiner

TRANSMIT OPPORTUNITY CONTINUATION TIMEOUT FOR DIRECTIONAL MULTI-GIGABIT NETWORKS

CROSS-REFERENCE TO RELATED APPLICATION

This application is a continuation of U.S. non-provisional application Ser. No. 16/087,092, filed Sep. 20, 2018, and entitled TRANSMIT OPPORTUNITY CONTINUATION TIMEOUT FOR DIRECTIONAL MULTI-GIGABIT NETWORKS, which is a national stage application under 35 U.S.C. § 371 of PCT International Application Serial No. PCT/US2016/068628, filed on Dec. 27, 2016, and entitled TRANSMIT OPPORTUNITY CONTINUATION TIMEOUT FOR DIRECTIONAL MULTI-GIGABIT NETWORKS, which is derived from U.S. provisional application Ser. No. 62/325,291, filed Apr. 20, 2016, and claims priority to that date for all applicable subject matter. The disclosures of the prior applications are considered part of and are hereby incorporated by reference in their entirety in the disclosure of this application.

TECHNICAL FIELD

This disclosure generally relates to systems and methods for wireless communications and, more particularly, to timeouts for wireless communication such as in 60 GHz networks including Wi-Gig.

BACKGROUND

Devices may communicate over a next generation 60 GHz (NG60) network, a directional multi-gigabit (DMG) network, an enhanced DMG (EDMG) network, and/or any other network.

DETAILED DESCRIPTION

Example embodiments described herein provide certain systems, methods, and devices, for providing signaling information to Wi-Fi devices in various Wi-Fi networks, including, but not limited to, IEEE 802.11ad and/or IEEE 802.11ay (i.e. Next Generation 60 GHz or NG60).

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

A directional multi-gigabit (DMG) communication may involve one or more directional links to communicate at a rate of multiple gigabits per second, for example, at least 1 gigabit per second, 7 gigabits per second, or any other rate. An amendment to a DMG operation in a 60 GHz band, e.g., according to an Institute of Electrical and Electronics Engineers (IEEE) 802.11ad standard, may be defined, for example, by an IEEE 802.11ay project (NG60 project). Stations (STAs) in compliance with 802.11ay may be termed enhanced DMG STAs. Tt is to be noted that "STA" as used herein may be used to refer among other things to a user device or to an access point (AP). In some demonstrative embodiments, one or more STAs may be configured to communicate over an EDMG basic service set (EDMG BSS), and/or any other network. In some scenarios, a DMG or EDMG STA may have reciprocal DMG or EDMG antennas. Hereinafter, DMG and EDMG will be used interchangeably, and are meant to refer to devices, or networks such BSS' compliant with either 802.11ad or 802.11ay, or other wireless communication standards based on 60 GHz.

In various communication regimes, including 802.11, such as 802.11ad and 802.11ay, a STA may use Request to Send (RTS) and Clear to Send (CTS) frames to reserve a transmission opportunity (TXOP). A transmission period may be defined by a duration of a TXOP, which may be a bounded time interval during which a STA may send as many frames as possible (as long as the duration of the transmissions does not extend beyond the duration of the TXOP).

A Network Allocation Vector (NAV) can refer to a virtual carrier-sensing mechanism that can be used with wireless network protocols. A header of a frame at the Medium Access Control layer (MAC layer) may include a duration field from which a transmission time required for transmission of the frame may be determined by the receiver. The STAs listening on the wireless medium that are different from the STA or STAs to which the frame payload is addressed (NAV setting STAs) may decode the duration field and set their NAVs accordingly (this deferring their access to the medium for the duration of the frame transmission). If a STA is an unintended receiver, it may update its NAV table, and, if it is a DMG STA, it may check if it can create an antenna pattern to avoid all the interference indicated by the active NAVs.

An expected TXOP continuation timeout can be used to allow a STA to set its NAV. The NAV setting STA can, for example, be a third-party device, and may not be an initiator STA (the STA sending the RTS) of or a responder STA (the STA to which the RTS is addressed) with respect to a TXOP. One or more NAV setting STAs however may not have received a Clear to Send (CTS) frame after receiving a Request to Send (RTS) frame from the initiator STA.

Some approaches, for example, those in accordance with an IEEE 802.11 standard, state in part that, a NAV setting STA that has used information from an RTS frame as the most recent basis to set its NAV can be permitted to reset its NAV only if a predetermined criterion is met. This criterion can, for example, be that a given primitive, for example, a PHY-RXSTART indication primitive, was not received from the physical layer (PHY) during the TXOP continuation timeout, the TXOP continuation timeout starting when the MAC receives a PHY-RXEND indication primitive that corresponds to the end of the received RTS. The TXOP continuation timeout can have a predetermined duration that may have a value equal to, for example, (2×aSIFSTime)+ (CTS_Time)+aRxPHYStartDelay+(2×aSlotTime). The PHY-RXEND.indication can refer to a service primitive transmitted to the MAC layer by the PHY layer of a STA to indicate that the reception of the MAC Protocol Data Unit (MPDU) has been completed. In the above example, the CTS_Time parameter may be calculated using the length of the CTS frame, and, in addition, the data rate at which the RTS frame that was used in the determination of the most recent NAV update was received.

The approach described above assumes that the CTS_Time parameter is predictable and constant. Such assumptions may be acceptable for operation in some networks, for example, in networks using the 2.4 GHz and/or 5 GHz frequency bands. However, such assumptions may not be acceptable for DMG networks. In such networks, the size of control frames, such as the size of DMG CTS frame, may depend among others on variable training fields which may be appended to the end of such frames. In some cases, the training length value may vary from approximately 0 microseconds (us) to approximately 91 us. These variable training fields may only be determinable if a STA is able to receive the DMG CTS frame, in which case it could determine the true value for the length of the DMG CTS frame. However, if a STA does not receive the DMG CTS frame, according to the above approach, such a STA could incorrectly set its NAV not having known the value for the length of the DMG CTS frame.

Therefore, the approach to use the length field of a DMG CTS frame to calculate the CTS_Time parameter to arrive at the TXOP continuation timeout may cause a substantial difference between an expected CTS_Time value, and a true CTS_Time value. The above would cause NAV setting STAs that do not receive the DMG CTS to incorrectly set their NAVs. In some situations, this may lead to the NAV not being set by the STA even if the RTS/CTS handshake succeeds and a TXOP is established.

Figure 1A:
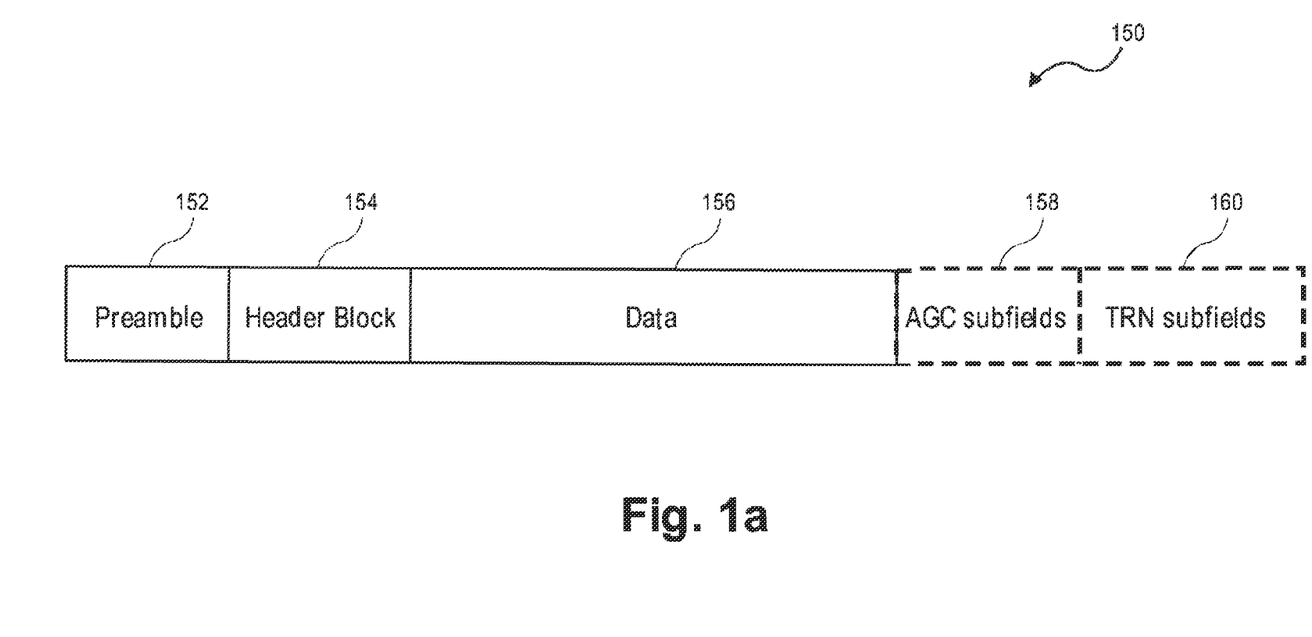
FIG. 1a shows an exemplary DMG control mode Physical Layer Convergence Protocol (PLCP) data unit (PPDU) according to the Institute of Electrical and Electronics Engineers (IEEE) 802.11REVmc standard.

As set forth in 802.11 REVmc, and as shown in FIG. 1a, a DMG control mode Physical Layer Convergence Protocol (PLCP) data unit (PPDU) is composed of a preamble, a header, a data field, and possibly Automatic Gain Control (AGC) and training (TRN) subfields, the AGC subfields allowing a regulation of the received signal strength such that the required signal SNR for proper decoding on the receiver side is met, and the TRN subfields allowing Antenna Weight Vector (AWV) training. The preamble is the part of the DMG control mode PPDU that is used for packet detection, AGC, frequency offset estimation, synchronization, indication of frame type and channel estimation. The header consists of several fields that define the details of the PPDU to be transmitted. The header includes a reserved field for differential detector initialization, a scrambler initialization field to denote bits of the initial scrambler state, a length field to indicate the number of data octets in the PSDU, a packet type field, a training length to indicate a length of the beamforming training field (BF training field), a turnaround field, reserved bits, and a header check sequence field.

According to some demonstrative embodiments, a wireless communication device, system, method and product are disclosed that are directed to DMG networks such as EDMG BSS', and in particular to providing alternative calculations of various parameters associated with DMG CTS frames, including alternative calculations of a CTS_Time parameter. In one embodiment, a wireless communication device, including, for example, a baseband processing circuitry, may have a memory and a processor coupled to the memory, where the processor includes logic to calculate a CTS_Time parameter associated with a DMG CTS frame based at least in part on a training length field. This may minimize the risk of setting the wrong NAV for third-party STAs. The logic may be configured to include a maximum size of the training length field in the DMG CTS_Time parameter calculation. For example, in a first approach (a), the DMG CTS_Time used to determine the TXOP continuation timeout can be calculated by adding a control mode preamble time parameter to a control mode header time parameter to a MAC Protocol Data Unit (MPDU) time parameter to a product of a constant multiplied by a beamforming (BF) training field time parameter. The constant can be equal to 32 In another approach (b), the logic may be configured to include a size of the training length field of the RTS frame in the calculation of the DMG CTS_Time parameter to be used in a determination of the TXOP continuation timeout. For example, DMG CTS_Time used to calculate the TXOP continuation timeout can be calculated by adding a control mode preamble time parameter to a control mode header time parameter to a MPDU time parameter to a product of a training length field for the RTS frame with a BF training field time parameter. In another approach (c), the logic could implement a subset of the above embodiments (a) and (b). For example, the maximum size of the training length may only be used in the calculation of the DMG CTS_Time parameter if the training length for the RTS frame is greater than or equal to 1. The control mode time parameter may be a time parameter related to the control mode preamble 152 of the DMG control mode PPDU 150 of FIG. 1a where the PPDU is an RTS frame or a CTS frame. The control mode header time parameter may be a time parameter related to the header block 154 of the control mode PPDU 150 of FIG. 1a where the PPDU is an RTS or a CTS frame. The MPDU time parameter may be a time parameter related to a data block 156 of the PPDU of FIG. 1a where the PPDU is an RTS frame or a CTS frame. The BF training field time parameter may be a time parameter related to the TRN subfields 160 of the PPDU 150 of FIG. 1a, where the PPDU is an RTS or a CTS frame. According to one embodiment, the control mode time parameter, the control mode header time parameter and the BF training field time parameter may be related to time parameters of correspondingly named portions of a PPDU such as the one in FIG. 1a where the PPDU is an RTS frame, while the MPDU time parameter may be related to the DMG RTS frame. A third-party STA that receives an RTS frame would know that the RTS frame belongs to an expected sequence including an RTS frame followed by a DMG CTS frame. The DMG CTS frame would also be a control frame of type control, and its MPDU (data block) part has a constant size and of a known rate, hence possible use of a time parameter related to the MPDU of the DMG CTS frame in the calculation of the CTS_Time parameter by a third-party STA.

Figure 1B:
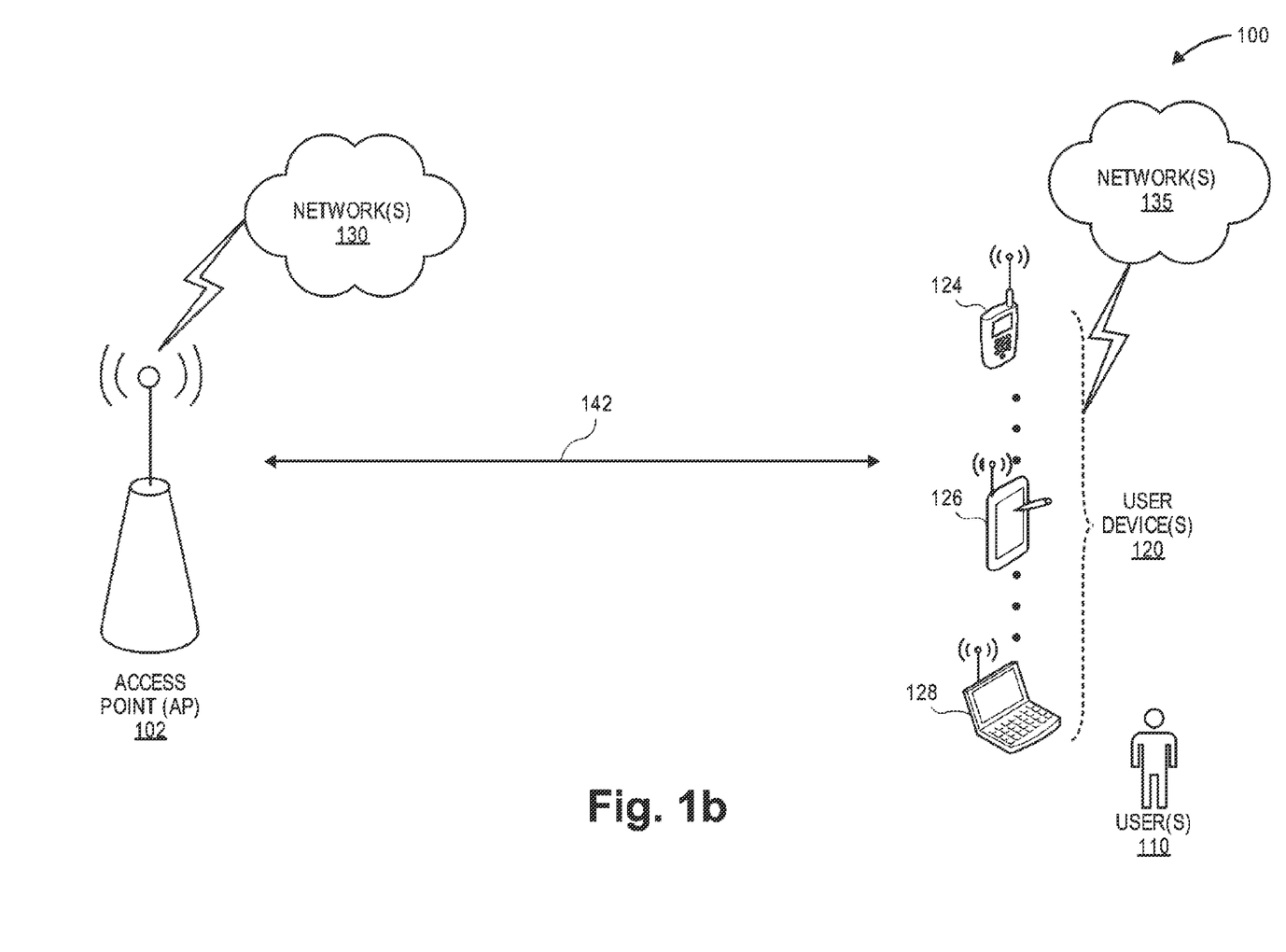
FIG. 1b shows an exemplary network environment, in accordance with one or more embodiments.

FIG. 1b is a network diagram illustrating an example network environment, according to some example embodiments of the present disclosure. Wireless network 100 may include one or more STAs 120 and one or more access point(s) (AP) 102, which may communicate in accordance with IEEE 802.11 communication standards, including, but not limited to, IEEE 802.11ad and/or IEEE 802.11ay. The STAs 120 may be mobile user devices that are non-stationary and do not have fixed locations.

The STAs 120 (e.g., 124, 126, or 128) may include any suitable processor-driven user device including, but not limited to, a desktop user device, a laptop user device, a server, a router, a switch, an access point, a smartphone, a tablet, a wearable wireless user device (e.g., bracelet, watch, glasses, ring, etc.) and so forth. In some embodiments, the STAs 120 and AP 102 may include one or more computer systems similar to that of the functional diagram of FIG. 3 and/or the example machine/system of FIG. 4, to be discussed further.

Returning to FIG. 1b, any of the STAs 120 (e.g., STAs 124, 126, 128), and AP 102 may be configured to communicate with each other via one or more communications networks 130 and/or 135 wirelessly or wired. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the STAs 120 (e.g., STAs 124, 126, 128), and AP 102 may include one or more communications antennae. Communications antenna may be any suitable type of antenna corresponding to the communications protocols used by the STAs 120 (e.g., STAs 124, 124 and 128), and AP 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, phased array antennas, or the like. The communications antennas may be communicatively coupled to a radio component to transmit and/or receive signals, such as communications signals to and/or from the STAs 120.

Any of the STAs 120 (e.g., STAs 124, 126, 128), and AP 102 may include any suitable baseband processing circuitry, and any suitable radio and/or transceiver for transmitting and/or receiving radio frequency (RF) signals in the bandwidth and/or channels corresponding to the communications protocols utilized by any of the STAs 120 and AP 102 to communicate with each other. The baseband processing circuitry may include a memory and one or more processors that may include hardware and software/logic to modulate and/or demodulate communications signals according to pre-established transmission protocols. The radio components may further have hardware in the form of a radio integrated circuit and a front-end module connected to the one or more antennas, and/or software instructions to communicate via one or more Wi-Fi and/or Wi-Fi direct protocols, as set forth in an IEEE 802.11 standards. In certain example embodiments, the baseband processing circuitry, radio component, in cooperation with the communications antennas, may be configured to communicate via 2.4 GHz channels (e.g. 802.11b, 802.11g, 802.11n), 5 GHz channels (e.g. 802.11n, 802.11ac), or 60 GHZ channels (e.g. 802.11ad). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

Typically, when an AP (e.g., AP 102) establishes communication with one or more STAs 120 (e.g., STAs 124, 126, and/or 128), the AP may communicate in the downlink direction by sending frames 142, such as data frames, management frames, or control frames. The control frames may, in various embodiments, include Request to Send (RTS) and Clear to Send (CTS) frames, and the CTS frames may further include DMG CTS frames. The frames may be preceded by one or more preambles that may be part of one or more headers. These preambles may be used to allow the user device to detect a new incoming frame from the AP. A preamble may be a signal used in network communications to synchronize transmission timing between two or more devices (e.g., between the APs and user devices).

In some demonstrative embodiments, one or more STAs may be configured to communicate a multi-user (MU) multiple-input and multiple-output (MIMO) frame, for example, over a 60 GHz frequency band. The one or more STAs may be configured to communicate in a mixed environment such that one or more legacy STAs are able to communicate with one or more non-legacy STAs. STAs may communicate with each other at least to some extent regardless of which IEEE 802.11 specification is followed.

Figure 2:
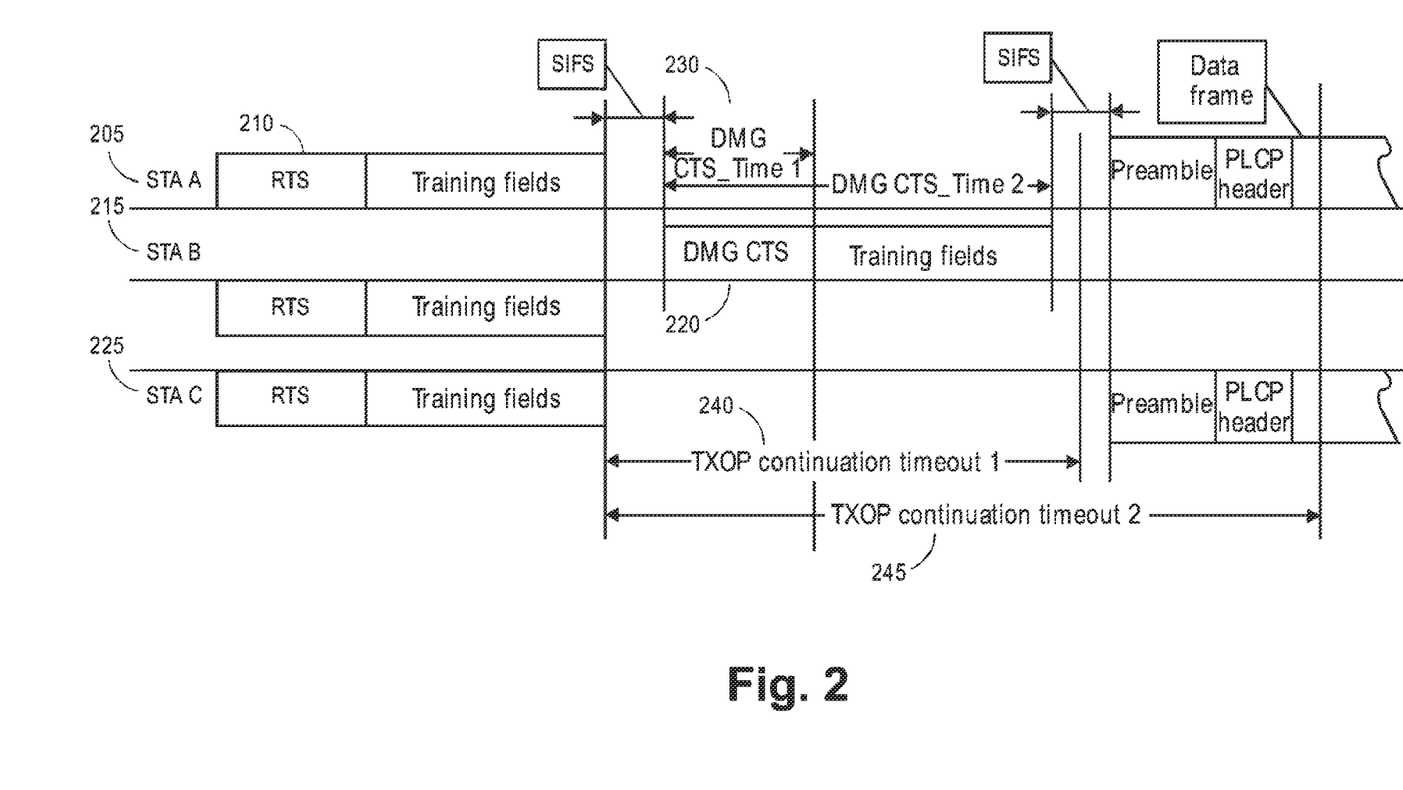
FIG. 2 shows a timing diagram illustrating aspects of the disclosure, in accordance with one or more embodiments of the disclosure.

FIG. 2 shows a timing diagram in accordance with various embodiments. In one embodiment, STA A 205 can send an RTS frame 210 to STA B 215 STA B 215 can then respond with a DMG CTS frame 220 to STA A 205. STA C 225 can receive the RTS frame 210, but may not receive the DMG CTS frame 220. The RTS frame 210 and the DMG CTS frame 220 can include one or more beamforming training fields as shown. In one embodiment, DMG CTS_Time 1 230 can represent a calculation not based at least in part on the training length field in either the CTS frame or the RTS frame, and DMG CTS_Time 2 235 can represent a calculation based at least in part on the training length field in either the RTS frame or the CTS frame. Similarly, TXOP continuation timeout 1 240 can represent a calculation not based at least in part on a training length field of either the RTS or CTS, and TXOP continuation timeout 2 245 can represent a calculation based at least in part on a training length field of the RTS or CTS. FIG. 1b suggests that using TXOP continuation timeout 1 (that is, not considering that the DMG CTS may have training fields appended to it) may not allow the setup of a NAV by STA C because TXOP continuation timeout 1 as shown ends earlier than the data frame to STA B can start. This can result in not receiving a PHY-RXSTART.indication primitive by STA C.

Further embodiments, as discussed below, can extend the TXOP continuation timeout. In one embodiment, the TXOP continuation timeout 2 245 can be long enough to cause the PHY-RXSTART.indication primitive to be received and the NAV to be set up by STA C 225.

In various embodiments, a TXOP continuation timeout system can be configured to include a maximum size of the training length field in the DMG CTS_Time parameter calculation. For example, in a first approach (a), the DMG CTS_Time used to determine the TXOP continuation timeout can be calculated by adding a control mode preamble time parameter to a control mode header time parameter to a MAC Protocol Data Unit (MPDU) time parameter to a product of a constant multiplied by a beamforming (BF) training field time parameter. The constant can be equal to 32. For example, DMG CTS_Time=ControlModePreambleTime ControlModeHeaderTime+MPDU_Time+32×BFTrainingFieldTime.

In another approach (b), the logic may be configured to include a size of the training length field of the RTS frame in the calculation of the DMG CTS_Time parameter to be used in a determination of the TXOP continuation timeout. For example, DMG CTS_Time used to calculate the TXOP continuation timeout can be calculated by adding a control mode preamble time parameter to a control mode header time parameter to a MPDU time parameter to a product of a training length field for the RTS frame with a BF training field time parameter. For example, DMG CTS_Time=ControlModePreambleTime+ControlModeleaderTime+MPDU_Time+TrainingLengthField (RTS)× BFTrainingFieldTime.

In another approach (c), a subset of the above embodiments can be implemented. For example, the maximum size of the training length may only be used in the calculation of the DMG CTS_Time parameter if the training length for the RTS frame is greater than or equal to 1.

Using approach (a) may delay the start of a backoff period by the NAV setting STA that that does not receive a DMG CTS of the RTS/DMG CTS handshake versus a third-party STA that receives the DMG CTS. Approach (a) assumes the worst-case scenario, setting a maximum TXOP continuation timeout period that could be possible within the network. Although this approach is substantially full-proof with respect to setting the TXOP continuation timeout while taking the CTS_Time into consideration, in can on the other hand unnecessarily cause latency.

Approach (b) may assume reciprocity, under an assumption that the CTS training field will be no longer than the RTS training field, which can that result in equal training fields of the RTS and DMG CTS frames. This assumption however, might not always be correct and may therefore affect the decision to set or not set the NAV of the STA.

In the next generation of 60 GHz band networks (e.g., 802.11ay), the RTS and DMG CTS frames may further be modified to provide functions that are next-generation specific, while still maintaining backward compatibility with legacy devices in a DMG network One example of such a modification can be in connection with the use of control trailers. It has already been proposed within 802.11ay to cause circuitry within a STA to generate a PPDU that includes a header field, a payload after the header field, and a control trailer after the payload. The control trailer is to include control information, for example for EDMG STAs, and the header is to indicate a presence of the control trailer, for example through the use of at least one bit, such as a reserved bit therein. The header may also indicate a length of the control trailer, including for example a training length field (TRN length field). The control information may include EDMG information elements, such as, for example, channel bonding information, channel information and bandwidth.

In various embodiments, various setup frames used to communicate between two devices (e.g., an AP and/or a user device) may include such control trailers. In such embodiments, a TXOP continuation timeout may be configured to take into account the length of the control trailer along with that of the beamforming (BF) training fields. In that case, a total time of the control trailer and/or the BF training fields may be covered by the training length field that is used in a calculation of the DMG CTS_Time parameter. In this case the approaches described in (a) and (b) above can be applicable as well, for example, to determine the total time of the control trailer and/or the BF training fields.

One embodiment applicable for next generation devices, for example, devices configured to operate according to 802.11ay standards or beyond, may include the devices being configured to calculate a DMG CTS_Time according to a next generation approach (d). Approach (d) can include providing information regarding a length of the control trailer and/or training field of the DMG CTS frame in the control trailer of a RTS frame. If the logic has information related to the beamforming capabilities within the responder STA, and a rule exists on how the responder STA shall construct the DMG CTS control trailer and BF training fields, then the size or length of the DMG CTS control trailer and the BF training fields in the RTS frame may accurately predict the total size or length of the DMG CTS control trailer and the BF training fields in the DMG CTS If, on the other hand, the TXOP continuation timeout system is not able to acquire such information, the RTS frame may contain an estimated length of the DMG CTS control trailer and BF training fields. This can be used as a recommendation for use by the responder STA and by third-party STAs to calculate the TXOP continuation timeout.

In one embodiment, the approach outlined in (d) above may be made backward compatible with "legacy" devices, for example, if the legacy devices implement one or more of approaches (a)-(c). In the context of this paragraph, "legacy" is meant to refer to devices compliant with standards prior to a next generation 60 GHz standard, such as the 802.11ad or 802.11ay standards.

Figure 3:
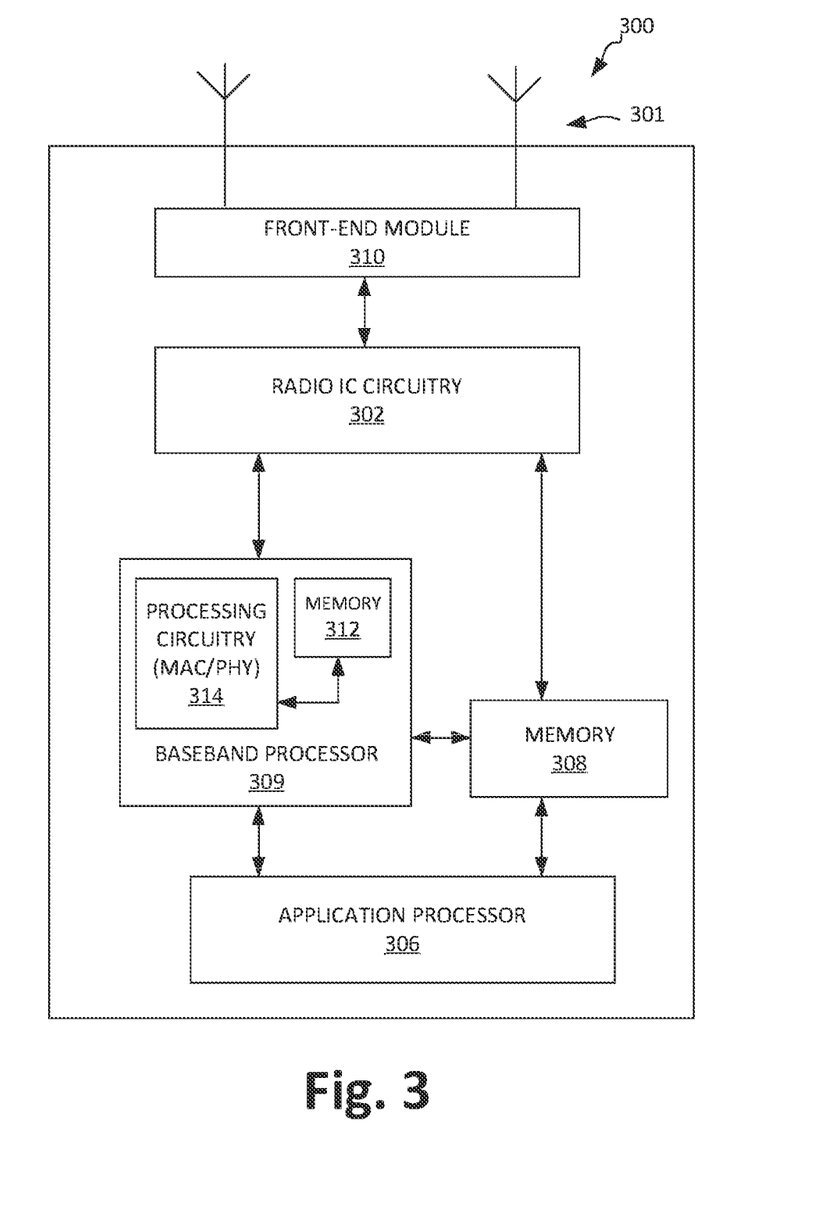
FIG. 3 illustrates a functional diagram of an example communication station that may be suitable for use as a user device, in accordance with one or more embodiments of the disclosure.

FIG. 3 shows a functional diagram of an exemplary STA 300 in accordance with some embodiments. In one embodiment, FIG. 3 illustrates a functional block diagram of a STA that may be suitable for use as an AP 102 (FIG. 1b) or user device 120 (FIG. 1b) in accordance with some embodiments. The STA 300 may also be suitable for use as a handheld device, mobile device, cellular telephone, smartphone, tablet, netbook, wireless terminal, laptop computer, wearable computer device, femtocell, High Data Rate (HDR) subscriber station, access point, access terminal, or other personal communication system (PCS) device.

The STA 300 may include radio IC circuitry 302 and a front-end module (FEM) 310 for transmitting and receiving signals to and from other communication stations using one or more antennas 301. The FEM 310 may include a receive signal path comprising circuitry configured to operate on 60 GHz signals received from one or more antennas 301, to amplify the received signals and to provide the amplified versions of the received signals to the radio IC circuitry 302 for further processing FEM 310 may also include a transmit signal path which may include circuitry configured to amplify signals provided by the radio IC circuitry 302 for wireless transmission by one or more of the antennas 301. Radio IC 302 may include a receive signal path which may include circuitry to down-convert signals received from the FEM circuitry 310 and provide baseband signals to a baseband processor 309. The radio IC circuitry 302 may also include a transmit signal path which may include circuitry to up-convert baseband signals provided by the baseband processor 309 and provide RF output signals to the FEM circuitry 310 for subsequent wireless transmission by the one or more antennas 301. Baseband processor 309 may include a memory 312, such as, for example, a set of RAM arrays in a Fast Fourier Transform or Inverse Fast Fourier Transform block (not shown) of the baseband processor 309. The memory 312 in baseband processor 309 may further including stored software and/or firmware for allowing the baseband processor to perform MAC and PHY operations, such as those described herein. Baseband processor 309 may further including processing circuitry 314 that may include control logic to process the signals received from the receive signal path of the radio IC circuitry 302. Baseband processor 309 is also configured to also generate corresponding baseband signals for the transmit signal path of the radio IC circuitry 302, and may further include physical layer (PHY) and medium access control layer (MAC) circuitry, and may further interface with an application processor 306 for generation and processing of the baseband signals and for controlling operations of the radio IC circuitry 302. In some embodiments, the system 300 and/or the baseband processor 309 may be configured to perform operations detailed in FIGS. 1-2.

In accordance with some embodiments, the baseband processor 309 may be arranged to contend for a wireless medium and configure frames or packets for communicating over the wireless medium. The STA 300 may be arranged to transmit and receive signals, the signals being caused to be transmitted or received by the baseband processor 309 and/or application processor 306. In some embodiments, baseband processor 309 and application processor 306 of the communication station 300 may each include one or more processors. In other embodiments, two or more antennas 301 may be coupled to the FEM 310 arranged for sending and receiving signals. The memory 308 and/or memory 312 may store information for configuring the application processor 306 and/or baseband processor 309 to perform operations for configuring and causing transmission or reception of message frames and performing the various operations described herein. The memory 308 or 312 may include any type of memory, including non-transitory memory, for storing information in a form readable by a machine (e.g., a computer). For example, the memory 308 or 312 may include a computer-readable storage device may, read-only memory (ROM), random-access memory (RAM), magnetic disk storage media, optical storage media, flash-memory devices and other storage devices and media.

In some embodiments, STA 300 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the STA 300 may include one or more antennas 301. The antennas 301 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 300 may include one or more of a keyboard, a display, a non-volatile memory port, multiple antennas, a graphics processor, an application processor, speakers, and other mobile device elements. The display may be an LCD screen including a touch screen.

Although STA 300 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 300 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 300 may include one or more processors and may be configured with instructions stored on a computer-readable storage device memory.

Figure 4:
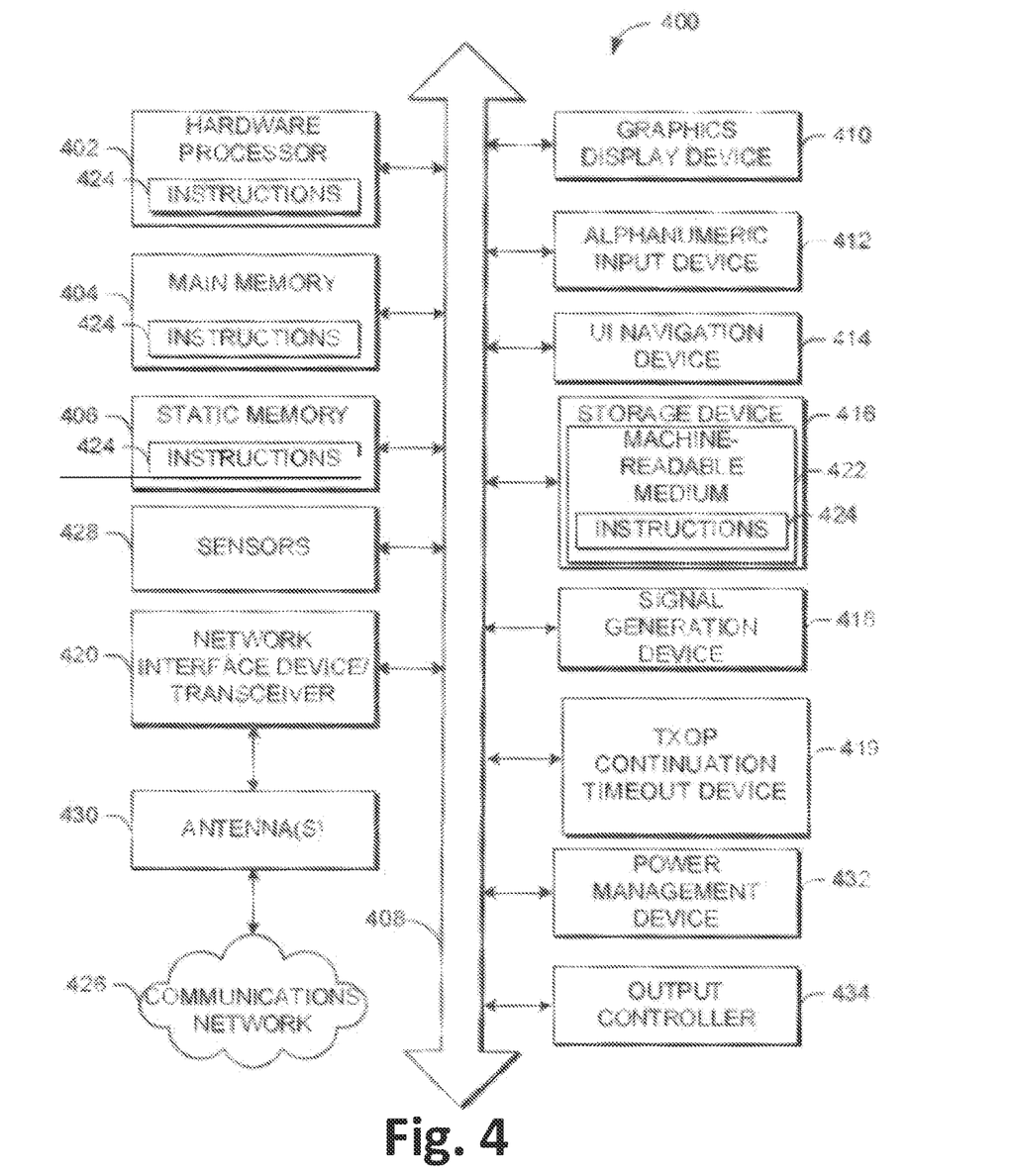
FIG. 4 shows a block diagram of an example machine upon which any of one or more techniques (e.g., methods) may be performed, in accordance with one or more embodiments of the disclosure.

FIG. 4 illustrates a block diagram of an example of a machine 400 or system upon which any one or more of the techniques (e.g., methodologies) discussed herein may be performed. In other embodiments, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in peer-to-peer (P2P) (or other distributed) network environments. The machine 400 may be a personal computer (PC), a tablet PC, a set-top box (STB), a personal digital assistant (PDA), a mobile telephone, wearable computer device, a web appliance, a network router, switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The machine 400 may further include a power management device 432, a graphics display device 410, an alphanumeric input device 412 (e.g., a keyboard), and a user interface (UT) navigation device 414 (e.g., a mouse). In an example, the graphics display device 410, alphanumeric input device 412, and UI navigation device 414 may be a touch screen display. The machine 400 may additionally include a storage device (i.e., drive unit) 416, a signal generation device 418 (e.g., a speaker), a TXOP Continuation Timeout Device 419, a network interface device/transceiver 420 coupled to antenna(s) 430, and one or more sensors 428, such as a global positioning system (GPS) sensor, compass, accelerometer, or another sensor. The machine 400 may include an output controller 434, such as a serial (e.g., universal serial bus (USB), parallel, or other wired or wireless (e.g., infrared (IR), near field communication (NFC), etc.) connection to communicate with or control one or more peripheral devices (e.g., a printer, card reader, etc.)).

The storage device 416 may include a machine readable medium 422 on which is stored one or more sets of data structures or instructions 424 (e.g., software) embodying or utilized by any one or more of the techniques or functions described herein. The instructions 424 may also reside, completely or at least partially, within the main memory 404, within the static memory 406, or within the hardware processor 402 during execution thereof by the machine 400. In an example, one or any combination of the hardware processor 402, the main memory 404, the static memory 406, or the storage device 416 may constitute machine-readable media.

The TXOP Continuation Timeout Device 419 (which may include for example logic within baseband processor 309 of FIG. 3) may be configured to determine a CTS_Time parameter based at least in part on a length of a training field associated with a DMG CTS or DMG RTS frame of another device within the communications network 426. The determination can be based at least in part on a maximum size of the length of the training field Where the training field considered is that of the DMG RTS frame, the determination can further include determining whether the length of the training field is greater than or equal to 1 in the RTS frame. The determination can be further based at least in part on a control mode preamble time parameter, a control mode header time parameter, a MAC Protocol Data Unit (MPDU) time parameter, and a beamforming (BF) training field time parameter. The determination can further be based at least in part on a size of the length of the training field of an RTS frame. The determination can further be based at least in part on a control mode preamble time parameter, a control mode header time parameter, a MPDU time parameter, a length of the training field for RTS parameter, and a BF training field time parameter. It is understood that the above are only a subset of what the TXOP Continuation Timeout Device 419 may be configured to perform and that other functions included throughout this disclosure may also be performed by the TXOP Continuation Timeout Device 419.

While the machine-readable medium 422 is illustrated as a single medium, the term "machine-readable medium" may include a single medium or multiple media (e.g., a centralized or distributed database, and/or associated caches and servers) configured to store the one or more instructions 424.

The term "machine-readable medium" may include any medium that is capable of storing, encoding, or carrying instructions for execution by the machine 400 and that cause the machine 400 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., Electrically Programmable Read-Only Memory (EPROM), or Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 424 may further be transmitted or received over a communications network 426 using a transmission medium via the network interface device/transceiver 420 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), Plain Old Telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 420 may include one or more physical jacks (e.g., Ethernet, coaxial, or phone jacks) or one or more antennas to connect to the communications network 426. In an example, the network interface device/transceiver 420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 400 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Reference is made to FIG. 65, which schematically illustrates a method in accordance with some demonstrative embodiments. For example, one or more of the operations of the method 500 of FIG. 5 may be performed by one or more elements of a STA, such as STA 300 of FIG. 3.

Figure 5:
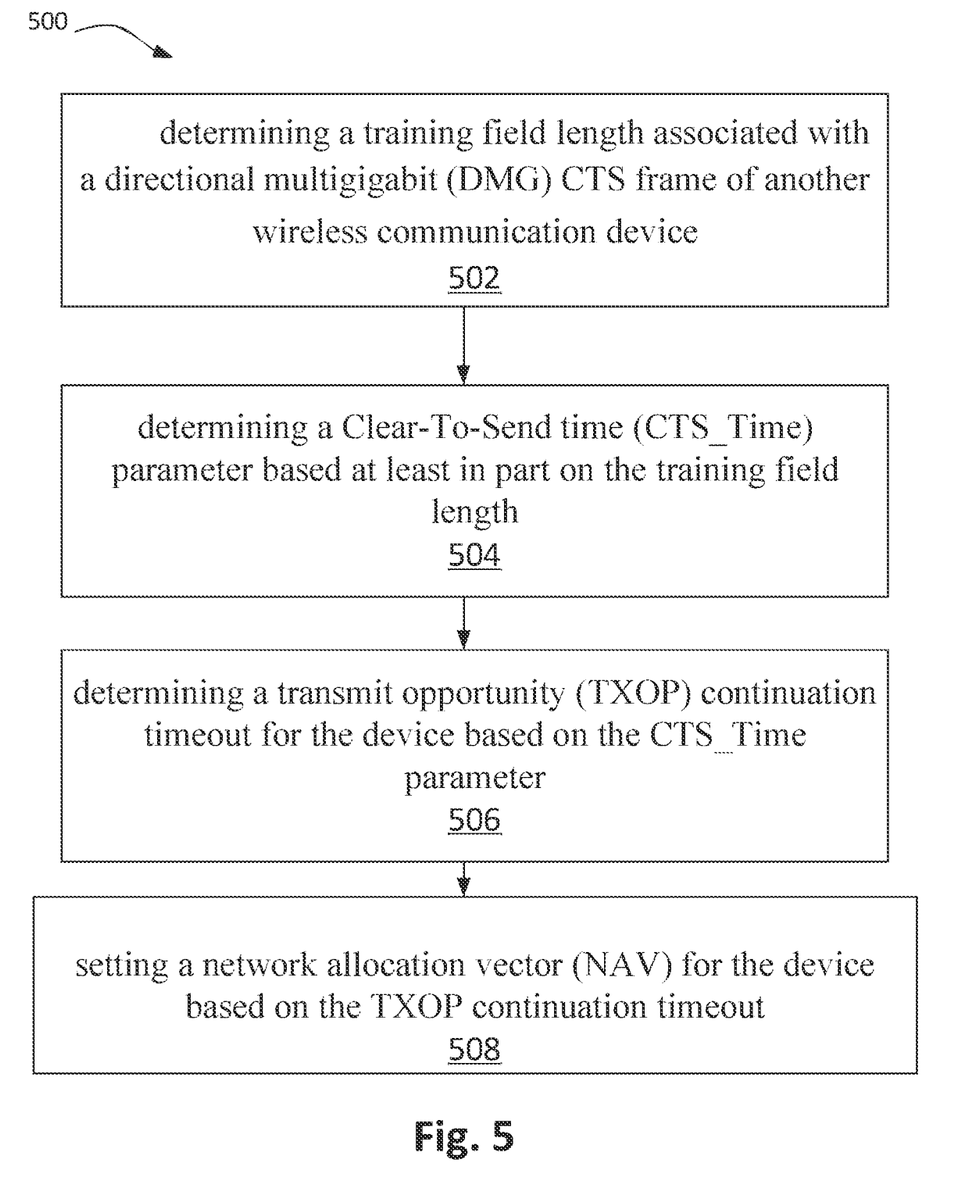
FIG. 5 shows a flow diagram of a method according to an exemplary embodiment.

As indicated at block 502, the method may include determining a training field length associated with a directional multigigabit (DMG) CTS frame of another wireless communication device. For example, the baseband processing circuitry 309 of FIG. 3 may be used to make the above estimate, using any of the approaches (a), (b) or (c) above. At block 504, the method may include determining a Clear-To-Send time (CTS_Time) parameter based at least in part on the training field length, and at block 506, the method may include determining a transmit opportunity (TXOP) continuation timeout for the device based on the CTS_Time parameter. It is to be noted that this CTS_Time may not be the true CTS_Time associated with a CTS sent to a RTS initiator (such as an EP) by another STA. Rather, the CTS_Time as noted here according to some demonstrative embodiments represents an estimated value of the true CTS_Time. Thereafter, at block 508, the method includes setting a network allocation vector (NAV) for the device based on the TXOP continuation timeout. In this way, a third-party device, such as a third-party baseband processing circuitry 309, may be able to determine a TXOP continuation timeout that would allow it to set its NAV in such a way as to significantly reduce collisions, even where the third-party device may not receive a CTS in a RTS/CTS exchange between two other devices.

As indicated at block 504, the method may include processing a low modulation packet configured according to a second wireless communication protocol from a candidate access point, the low modulation packet being at a modulation rate lower than a lowest modulation rate for the first wireless communication protocol. For example, LP-WU baseband processing circuitry 208b of FIG. 2 may be used to process the low modulation packet, and the low modulation packet may be from either AP1 or AP3 as shown in FIG. 1 or FIG. 3.

As indicated at block 606, the method may include determining a received signal strength indicator (RSSI) value of the low modulation packet. For example, the MAC mobility management processor 213 or application processor 211 may determine an RSSI value of the low modulation packet from AP1 or AP3 of FIG. 1 or FIG. 3.

As indicated at block 608, the method may include processing a frame including information on an address of the candidate access point, the frame being from the serving access point, from the candidate access point, or from another wireless communication device. For example, WLAN baseband processing circuitry 208a may be used to process a frame, such as a neighbor reporting frame or other frame, from either the serving access point AP1 of FIG. 3, the candidate access point AP3 of FIG. 3, or another device, such as, for example, eNodeB in FIG. 3.

The word "exemplary" is used herein to mean "serving as an example, instance, or illustration." Any embodiment described herein as "exemplary" is not necessarily to be construed as preferred or advantageous over other embodiments. The terms "computing device", "user device", "communication station", "station", "handheld device", "mobile device", "wireless device" and "user equipment" (UE) as used herein refers to a wireless communication device such as a cellular telephone, smartphone, tablet, netbook, wireless terminal, laptop computer, a femtocell, High Data Rate (HDR) subscriber station, access point, printer, point of sale device, access terminal, or other personal communication system (PCS) device. The device may be either mobile or stationary. In addition, when "at least one of" a given set or list of items connected with "and" is mentioned herein, what is meant is a reference to either one of the noted items or any combination of the items. For example, as used herein, "at least one of A, B, and C" means A, or B, or C, or A and B, or A and C, or B and C, or A and B and C.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as 'communicating', when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

The term "access point" (AP) as used herein may be a fixed station. An access point may also be referred to as an access node, a base station, or some other similar terminology known in the art. An access terminal may also be called a mobile station, user equipment (UE), a wireless communication device, or some other similar terminology known in the art. Embodiments disclosed herein generally pertain to wireless networks. Some embodiments can relate to wireless networks that operate in accordance with one of the IEEE 802.11 standards.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (AN) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems following one or more wireless communication protocols, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems, and/or networks.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

EXAMPLES

The following examples pertain to further embodiments.

Example 1 includes a wireless communication device comprising a memory, and processing circuitry coupled to the memory, the processing circuitry including logic to: determine a training field length associated with a directional multigigabit (DMG) CTS frame of another wireless communication device; determine a Clear-To-Send time (CTS_Time) parameter based at least in part on the training field length: determine a transmit opportunity (TXOP) continuation timeout for the device based on the CTS_Time parameter; and set a network allocation vector (NAV) for the device based on the TXOP continuation timeout.

Example 2 includes the subject matter of Example 1, and, optionally, wherein the logic is to determine the training field length associated with the DMG CTS frame by estimating a maximum possible length for the DMG CTS frame.

Example 3 includes the subject matter of Example 1, and, optionally, wherein the logic is to estimate a maximum possible length for the DMG CTS frame if a training length of a received Request-To-Send (RTS) frame is greater than or equal to 1.

Example 4 includes the subject matter of Example 1, and optionally, wherein the logic is to determine the training field length associated with the DMG CTS frame based at least in part on a sum of a control mode preamble time parameter, a control mode header time parameter, and a medium access control protocol data unit (MPDU) time parameter.

Example 5 includes the subject matter of Example 4, and optionally, wherein the logic is to determine the training field length associated with the DMG CTS frame further based on a beamforming training field time parameter.

Example 6 includes the subject matter of any one of Examples 4-5, and optionally, wherein the logic is to determine the training field length associated with the DMG CTS frame further based on the sum plus a beamforming training field time parameter multiplied by a training length field of a received Request-To-Send (RTS) frame.

Example 7 includes the subject matter of any one of Examples 4-5, and optionally, wherein the logic is to determine the training field length associated with the DMG CTS frame further based on the sum plus a beamforming training field time parameter multiplied by a training length field of a received Request-To-Send (RTS) frame.

Example 8 includes the subject matter of any one of Examples 4-5, and optionally, wherein the logic is to determine the training field length associated with the DMG CTS frame further based on the sum plus a beamforming training field time parameter multiplied by 32.

Example 9 includes the subject matter of any one of Examples 1-5, and optionally, further including a front-end module (FEM) and a radio integrated circuit coupled to the FEM.

Example 10 includes the subject matter of Example 9, and optionally, further including a plurality of antennas coupled to the FEM.

Example 11 includes a product comprising one or more tangible computer-readable non-transitory storage media comprising computer-executable instructions operable to, when executed by at least one computer processor, enable the at least one computer processor to implement operations at a wireless communication device, the operations comprising: determining a training field length associated with a directional multigigabit (DMG) CTS frame of another wireless communication device; determining a Clear-To-Send time (CTS_Time) parameter based at least in part on the training field length; determining a transmit opportunity (TXOP) continuation timeout for the device based on the CTS_Time parameter; setting a network allocation vector (NAV) for the device based on the TXOP continuation timeout.

Example 12 includes the subject matter of Example 11, and optionally, wherein determining the training field length associated with the DMG CTS frame includes estimating a maximum possible length for the DMG CTS frame.

Example 13 includes the subject matter of Example 12, and optionally, wherein estimating includes estimating a maximum possible length for the DMG CTS frame if a training length of a received Request-To-Send (RTS) frame is greater than or equal to 1.

Example 14 includes the subject matter of Example 11, and optionally, wherein determining the training field length associated with the DMG CTS frame includes basing the training field length at least in part on a sum of a control mode preamble time parameter, a control mode header time parameter, and a medium access control protocol data unit (MPDU) time parameter.

Example 15 includes the subject matter of Example 14, and optionally, wherein determining the training field length associated with the DMG CTS frame further includes basing the training field length on a beamforming training field time parameter.

Example 16 includes the subject matter of any one of Examples 14-15, wherein determining the training field length associated with the DMG CTS frame includes basing the training field length on the sum added to a beamforming training field time parameter multiplied by a training length field of a received Request-To-Send (RTS) frame.

Example 17 includes the subject matter of any one of Examples 14-15, wherein determining the training field length associated with the DMG CTS frame further includes basing the training field length on the sum added to a beamforming training field time parameter multiplied by 32.

Example 18 includes the subject matter of any one of Examples 11-15, further including a front-end module (FEM) and a radio integrated circuit coupled to the FEM.

Example 19 includes the subject matter of Example 18, and optionally, further including one or more antennas coupled to the FEM.

Example 20 includes a method to be performed by a wireless communication device, the method comprising: determining a training field length associated with a directional multigigabit (DMG) CTS frame of another wireless communication device; determining a Clear-To-Send time (CTS_Time) parameter based at least in part on the training field length; determining a transmit opportunity (TXOP) continuation timeout for the device based on the CTS_Time parameter, setting a network allocation vector (NAV) for the device based on the TXOP continuation timeout.

Example 21 includes the method of Example 20, and optionally, wherein determining the training field length associated with the DMG CTS frame includes estimating a maximum possible length for the DMG CTS frame.

Example 22 includes the method of Example 21, and optionally, wherein estimating includes estimating a maximum possible length for the DMG CTS frame if a training length of a received Request-To-Send (RTS) frame is greater than or equal to 1.

Example 23 includes the method of Example 20, and optionally, wherein determining the training field length associated with the DMG CTS frame includes basing the training field length at least in part on a sum of a control mode preamble time parameter, a control mode header time parameter, and a medium access control protocol data unit (MPDU) time parameter.

Example 24 includes the method of Example 23, and optionally, wherein determining the training field length associated with the DMG CTS frame further includes basing the training field length on a beamforming training field time parameter.

Example 25 includes the method of any one of Examples 23-24, and optionally, wherein determining the training field length associated with the DMG CTS frame includes basing the training field length on the sum added to a beamforming training field time parameter multiplied by a training length field of a received Request-To-Send (RTS) frame.

Example 26 includes the method of any one of Examples 23-24, and optionally, wherein determining the training field length associated with the DMG CTS frame further includes basing the training field length on the sum added to a beamforming training field time parameter multiplied by 32.

Example 27 includes the method of any one of Examples 23-24, and optionally, further including using a front-end module (FEM) and a radio integrated circuit coupled to the FEM to communicate in a DMG network.

Example 28 includes the method of Example 27, and optionally, further including using one or more antennas coupled to the FEM to transmit and receive within the DMG network.

Example 29 includes a wireless communication device comprising: means for determining a training field length associated with a directional multigigabit (DMG) CTS frame of another wireless communication device; means for determining a Clear-To-Send time (CTS_Time) parameter based at least in part on the training field length; means for determining a transmit opportunity (TXOP) continuation timeout for the device based on the CTS_Time parameter; means for setting a network allocation vector (NAV) for the device based on the TXOP continuation timeout.

Example 30 includes the subject matter of Example 29, and optionally, wherein determining the training field length associated with the DMG CTS frame includes estimating a maximum possible length for the DMG CTS frame.

Example 31 includes the subject matter of Example 30, and optionally, wherein the means for estimating includes means for estimating a maximum possible length for the DMG CTS frame if a training length of a received Request-To-Send (RTS) frame is greater than or equal to 1.

Example 32 includes the subject matter of Example 29, and optionally, wherein the means for determining the training field length associated with the DMG CTS frame includes means for calculating the training field length at least in part based on a sum of a control mode preamble time parameter, a control mode header time parameter, and a medium access control protocol data unit (MPDU) time parameter.

Example 33 includes the subject matter of Example 32, and optionally, wherein the means for determining the training field length associated with the DMG CTS frame further includes means for calculating the training field length at least in part based on a beamforming training field time parameter.

Example 34 includes the subject matter of any one of Examples 32-33, and optionally, wherein the means for determining the training field length associated with the DMG CTS frame includes means for calculating the training field length at least in part based on the sum added to a beamforming training field time parameter multiplied by a training length field of a received Request-To-Send (RTS) frame.

Example 35 includes the subject matter of any one of Examples 32-33, and optionally, wherein the means for determining the training field length associated with the DMG CTS frame further includes basing the training field length on the sum added to a beamforming training field time parameter multiplied by 32.

Example 36 includes the subject matter of any one of Examples 32-33, and optionally, further including means for transmitting and receiving wireless signals.

Example 37 includes a wireless communication device comprising a memory, and processing circuitry coupled to the memory, the processing circuitry including logic to: cause transmission of a Request-to-Send (RTS) frame, the RTS frame including information regarding a length of a Clear-to-Send (CTS) frame to be sent to the device by responder device responding to the RTS frame; process the CTS frame.

Example 38 includes the subject matter of Example 37, and optionally, wherein the information is based on at least one of a length of a control trailer of the CTS frame and a length of a training field of the CTS frame.

Example 39 includes the subject matter of any one of Examples 37-38, and optionally, wherein the information is based on known beamforming capabilities of the responder device, and based on a rule predicting a length of a control trailer and beamforming trailer of the CTS frame.

Example 40 includes the subject matter of Example 37, and optionally, wherein the information is based on an estimated length of the CTS frame.

Example 41 includes the subject matter of Example 37, and optionally, further including a front-end module (FEM) and a radio integrated circuit coupled to the FEM.

Example 42 includes the subject matter of Example 41, and optionally, further including a plurality of antennas.

Example 43 includes a product comprising one or more tangible computer-readable non-transitory storage media comprising computer-executable instructions operable to, when executed by at least one computer processor, enable the at least one computer processor to implement operations at a wireless communication device, the operations comprising: causing transmission of a Request-to-Send (RTS) frame, the RTS frame including information regarding a length of a Clear-to-Send (CTS) frame to be sent to the device by responder device responding to the RTS frame; and processing the CTS frame.

Example 44 includes the subject matter of Example 43, and optionally, further including determining the information based on at least one of a length of a control trailer of the CTS frame and a length of a training field of the CTS frame.

Example 45 includes the subject matter of any one of Examples 43-44, further including determining the information based on known beamforming capabilities of the responder device, and based on a rule predicting a length of a control trailer and beamforming trailer of the CTS frame.

Example 46 includes the subject matter of Example 43, and optionally, further including determining the information based on an estimated length of the CTS frame.

Example 47 includes the subject matter of Example 43, and optionally, further including a front-end module (FEM) and a radio integrated circuit coupled to the FEM.

Example 48 includes the subject matter of Example 47, and optionally, further including a plurality of antennas.

Example 49 includes a method to be performed by a wireless communication device, the method comprising: causing transmission of a Request-to-Send (RTS) frame, the RTS frame including information regarding a length of a Clear-to-Send (CTS) frame to be sent to the device by responder device responding to the RTS frame; and processing the CTS frame.

Example 50 includes the method of Example 49, and optionally, further including determining the information based on at least one of a length of a control trailer of the CTS frame and a length of a training field of the CTS frame.

Example 51 includes the method of any one of Examples 49-50, and optionally, further including determining the information based on known beamforming capabilities of the responder device, and based on a rule predicting a length of a control trailer and beamforming trailer of the CTS frame.

Example 52 includes the method of Example 51, and optionally, further including determining the information based on an estimated length of the CTS frame.

Example 53 includes a wireless communication device comprising a memory, and processing circuitry coupled to the memory, the processing circuitry including logic to: process a Request-to-Send (RTS) frame, the RTS frame including information regarding a length of a Clear-to-Send (CTS) frame to be sent to the device by responder device responding to the RTS frame; determine a transmit opportunity (TXOP) continuation timeout for the device based on the information, set a network allocation vector (NAV) for the device based on the TXOP continuation timeout.

Example 54 includes the subject matter of Example 53, and optionally, wherein the information is based on at least one of a length of a control trailer of the CTS frame and a length of a training field of the CTS frame.

Example 55 includes the subject matter of any one of Examples 53-54, and optionally, wherein the information is based on known beamforming capabilities of the responder device, and based on a rule predicting a length of a control trailer and beamforming trailer of the CTS frame.

Example 56 includes the subject matter of Example 53, and optionally, wherein the information is based on an estimated length of the CTS frame.

Example 57 includes the subject matter of Example 53, and optionally, further including a front-end module (FEM) and a radio integrated circuit coupled to the FEM.

Example 58 includes the subject matter of Example 57, and optionally, further including a plurality of antennas.

Example 59 includes a product comprising one or more tangible computer-readable non-transitory storage media comprising computer-executable instructions operable to, when executed by at least one computer processor, enable the at least one computer processor to implement operations at a wireless communication device, the operations comprising: processing a Request-to-Send (RTS) frame, the RTS frame including information regarding a length of a Clear-to-Send (CTS) frame to be sent to the device by responder device responding to the RTS frame; determining a transmit opportunity (TXOP) continuation timeout for the device based on the information; setting a network allocation vector (NAV) for the device based on the TXOP continuation timeout.

Example 60 includes the subject matter of Example 59, and optionally, wherein the information is based on at least one of a length of a control trailer of the CTS frame and a length of a training field of the CTS frame.

Example 61 includes the subject matter of Examples 59-60, and optionally, wherein the information is based on known beamforming capabilities of the responder device, and based on a rule predicting a length of a control trailer and beamforming trailer of the CTS frame.

Example 62 includes the subject matter of Example 59, and optionally, wherein the information is based on an estimated length of the CTS frame.

Example 63 includes the subject matter of Example 59, and optionally, further including a front-end module (FEM) and a radio integrated circuit coupled to the FEM.

Example 64 includes a method to be performed by a wireless communication device, the method comprising: processing a Request-to-Send (RTS) frame, the RTS frame including information regarding a length of a Clear-to-Send (CTS) frame to be sent to the device by responder device responding to the RTS frame; determining a transmit opportunity (TXOP) continuation timeout for the device based on the information; setting a network allocation vector (NAV) for the device based on the TXOP continuation timeout.

Example 65 includes the subject matter of Example 64, wherein the information is based on at least one of a length of a control trailer of the CTS frame and a length of a training field of the CTS frame.

Example 66 includes the subject matter of claims 64-65, and optionally, wherein the information is based on known beamforming capabilities of the responder device, and based on a rule predicting a length of a control trailer and beamforming trailer of the CTS frame.

Example 67 includes the method of Example 64, and optionally, wherein the information is based on an estimated length of the CTS frame.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A method to be performed at a wireless communication device, the method including:
    determining that the device is different from one or more devices to which a directional multigigabit (DMG) Request-to-Send (RTS) frame is addressed by an access point over a wireless medium;
    determining a length of a training field of the DMG RTS frame;
    determining a Clear-to-Send (CTS) time parameter associated with a DMG CTS frame sent from another device to the access point, the CTS time parameter being based on the length of the training field of the DMG RTS frame; and
    setting a network allocation vector (NAV) for the device based on the CTS time parameter to defer access of the device to the wireless medium for a timeout period.

2. The method of claim 1, wherein the timeout has a value based on a sum of 2×(aSIFSTime), (CTS time parameter) and (2×aSlotTime).

3. The method of claim 2, wherein the timeout has a value equal to (2×aSIFSTime)+(CTS_Time)+aRxPHYStartDelay+(2×aSlotTime).

4. The method of claim 1, wherein the DMG RTS frame is a control mode Physical Layer Convergence Protocol (PLCP) data unit (PPDU) including a preamble, a header block, a data field, Automatic Gain Control (AGC) subfields and training (TRN) subfields.

5. The method of claim 1, further including communicating over a 60 GHz frequency band using a multi-user multiple-input multiple-output (MU-MIMO) frame.

6. The method of claim 1, further including determining the training field length associated with the DMG CTS frame based at least in part on a sum of a control mode preamble time parameter, a control mode header time parameter, and a medium access control protocol data unit (MPDU) time parameter.

7. The method of claim 6, further including determining the training field length associated with the DMG CTS frame further based on a beamforming training field time parameter.

8. The method of claim 7, further including determining the training field length associated with the DMG CTS frame further based on the sum plus a beamforming training field time parameter multiplied by a training length field of a received Request-To-Send (RTS) frame.

9. The method of claim 1, further including using a front-end module (FEM) of the wireless communication device and a radio integrated circuit of the wireless communication device to cause communication on the wireless medium.

10. The method of claim 9, further including using a plurality of antennas coupled to the FEM and to the radio integrated circuit to communicate on the wireless medium.

* * * * *